US011988007B2

(12) United States Patent
Liu et al.

(10) Patent No.: US 11,988,007 B2
(45) Date of Patent: May 21, 2024

(54) ROTATING LOCKING STRUCTURE

(71) Applicant: Global Maxlead Ltd., Shenzhen (CN)

(72) Inventors: Zhongliang Liu, Guangdong (CN); Jin Feng, Guangdong (CN); Yujiao Liang, Guangdong (CN); Juan He, Guangdong (CN); Chanyu Wang, Guangdong (CN); Liyu Huang, Guangdong (CN)

(73) Assignee: Global Maxlead Ltd, Shenzhen (CN)

( * ) Notice: Subject to any disclaimer, the term of this patent is extended or adjusted under 35 U.S.C. 154(b) by 167 days.

(21) Appl. No.: 17/670,535

(22) Filed: Feb. 14, 2022

(65) Prior Publication Data

US 2023/0064601 A1 Mar. 2, 2023

(30) Foreign Application Priority Data

Aug. 30, 2021 (CN) ......................... 202111006656.0
Nov. 9, 2021 (CN) ......................... 202111320111.7

(51) Int. Cl.
*E04H 15/50* (2006.01)
*E04H 15/32* (2006.01)
*E04H 15/26* (2006.01)
*E05B 65/00* (2006.01)

(52) U.S. Cl.
CPC ............. *E04H 15/50* (2013.01); *E04H 15/32* (2013.01); *E04H 15/26* (2013.01); *E05B 65/00* (2013.01)

(58) Field of Classification Search
CPC ...................................................... E04H 15/50
See application file for complete search history.

(56) References Cited

U.S. PATENT DOCUMENTS

| | | | | |
|---|---|---|---|---|
| 9,995,056 B2 * | 6/2018 | Yang | ........................ | E04H 15/50 |
| 10,060,153 B2 * | 8/2018 | Song | ........................ | E04H 15/34 |
| 10,107,005 B2 * | 10/2018 | Song | ........................ | E04H 15/44 |
| 10,273,710 B2 * | 4/2019 | Yang | ........................ | E05B 65/00 |
| 10,273,711 B2 * | 4/2019 | Song | ........................ | E04H 15/48 |
| 10,378,235 B1 * | 8/2019 | Volin | ........................ | E04H 15/46 |
| 10,669,738 B2 * | 6/2020 | Yang | ........................ | E04H 15/50 |
| 10,822,829 B1 * | 11/2020 | Lu | ........................ | E04H 15/32 |
| 10,941,585 B2 * | 3/2021 | Sun | ........................ | E04H 15/50 |
| 10,982,464 B2 * | 4/2021 | Ying | ........................ | E04H 15/44 |
| 10,995,514 B2 * | 5/2021 | Xu | ........................ | E04H 15/50 |
| 11,002,036 B1 * | 5/2021 | Zhang | ........................ | E04H 15/48 |
| 11,085,201 B2 * | 8/2021 | Sun | ........................ | E04H 15/50 |
| 11,199,023 B2 * | 12/2021 | Sun | ........................ | E04H 15/50 |
| 11,306,502 B2 * | 4/2022 | Chen | ........................ | E04H 15/50 |
| 11,306,511 B2 * | 4/2022 | Sun | ........................ | E04H 15/50 |
| 2021/0238880 A1 * | 8/2021 | Qiu | ........................ | E04H 15/32 |

(Continued)

*Primary Examiner* — David R Dunn
*Assistant Examiner* — Danielle Jackson

(57) ABSTRACT

The invention discloses a center lock structure, comprises a chassis, rotary sliding sleeve and a center rod, the top of the rotary sliding sleeve is circumferentially and slidely connected with the chassis; and the center rod is extended into the rotary sliding sleeve along the top of the chassis, an elastic member is provided at one side on the bottom of the center rod, the elastic member is exposed outside the center rod when there is no external force, and the elastic member is concealed in the center rod when squeezed by an external force; in the invention, by the center rod, upper and lower rotary sliding sleeve, through holes and the accommodating grooves for pressing or releasing the elastic member, the structure can be unlocked by rotation and pull-down.

7 Claims, 11 Drawing Sheets

(56) References Cited

U.S. PATENT DOCUMENTS

| | | | | |
|---|---|---|---|---|
| 2021/0355703 | A1* | 11/2021 | Sun | E04H 15/50 |
| 2023/0193651 | A1* | 6/2023 | Qiu | E04H 15/28 135/128 |

* cited by examiner

ROTATING LOCKING STRUCTURE

TECHNICAL FIELD

The invention relates to the tent field, in particular to a rotating locking structure.

BACKGROUND ART

Tent generally includes folding tent frame and tarpaulin, tent frame includes a roof frame, and a plurality of support legs, support legs used to support the roof frame, and tarpaulin covered on the roof frame, to achieve the effect of shelter from sun, rain or wind; and center lock is the key components to realize the unfolding and folding of the tent, the traditional center lock structure is relatively complex, has more cumbersome procedures to achieve folding and unfolding, operation is more troublesome, bring some inconvenience to users, thereby limiting its rapid development thereof, in the prior art, other center lock structure is unlocked by press, which may be cause pinching hand, and press parts easy to loss, thereby the problem of ineffective operation, bring inconvenience to use.

SUMMARY OF THE INVENTION

In order to solve above technical scheme, the invention provides the following technical schemes: a center lock structure, comprises a chassis, rotary sliding sleeve and a center rod, the top of the rotary sliding sleeve is circumferentially and slidely connected with the chassis, and the center rod is extended into the rotary sliding sleeve along the top of the chassis, the top of the chassis is provided with multiple sets of rib fixing member; an elastic member is provided at one side on the bottom of the center rod, the elastic member is exposed outside the center rod when there is no external force, and the elastic member is concealed in the center rod when squeezed by an external force; the chassis and the rotary sliding sleeve are respectively provided with a first through hole and a second through hole that make the elastic member concealed in the center rod, and the top of the first through hole is provided with a funnel through hole with an inner diameter gradually increases from bottom to top, one outer side of the second through hole is provided with an elastic member accommodating groove, and the elastic member is ejected from the accommodating groove, thereby the center rod is locked with the rotary sliding sleeve, when the rotary sliding sleeve rotates to make the side wall of the accommodating groove press the elastic member into the center rod, the center rod and the rotary sliding sleeve are unlocked.

Further, the rotary sliding sleeve comprises upper rotary sliding sleeve and lower rotary sliding sleeve, the second through hole comprises an upper through hole arranged on the upper rotary sliding sleeve and a lower through hole arranged on the lower rotary sliding sleeve, the accommodating groove is arranged at top of the lower through hole, the side wall of the accommodating groove and the side wall of the lower through hole are arc-transitionally connected, and a boss is provided at the lower part of the accommodating groove.

The invention provides an embodiment that the upper rotary sliding sleeve and the lower rotary sliding sleeve are integrally formed or connected and fixed by a fixing component, the rotary sliding sleeves are relatively rotated with the chassis to realize locking and unlocking of the center rod.

Further, the bottom of the chassis is provided with multiple buckles that cooperate with the rotary sliding sleeves, the bottom of the chassis is also provided with a limiter mounting hole, and the top of the upper rotary sliding sleeve is provided with buckle mounting holes corresponding to the number of buckles, the top of the buckle mounting hole penetrates the top surface of the upper rotary sliding sleeve, and the bottom thereof is provided with a buckle sliding groove along the inner wall of the upper rotary sliding sleeve, thereby the buckle enters the buckle sliding groove from the buckle mounting hole and can circumferentially slide along the buckle sliding groove.

Further, a limiter mounting groove is provided on the bottom surface of the upper rotary sliding sleeve and penetrates the upper rotary sliding sleeve, and the limiter mounting groove is an elongated sliding hole arranged along the inner wall of the upper rotary sliding sleeve, when the limiter mounting groove corresponds to the limiter mounting hole, a limiter that extends into the limiter mounting groove is arranged inside the limiter mounting hole.

Further, a spring first mounting hole is provided on the buckle, an upper baffle is provided between the inner wall of the upper rotary sliding sleeve and the outer wall of the upper through hole, the upper baffle is provided with a spring second mounting hole, one end of first spring is arranged on the buckle on the bottom of the chassis, the other end thereof is arranged on the upper baffle on the upper rotary sliding sleeve;

Further, the bottom surface of the upper rotary sliding sleeve is provided with a first fixing member mounting hole mounted and fixed with the lower rotary sliding sleeve; reinforcing ribs are provided between the inner wall of the lower rotary sliding sleeve and the outer wall of the lower through hole, the reinforcing rib is provided with a fixing member column corresponding to the first fixing member mounting hole, and a second fixing member mounting hole is provided in the fixing member column.

Further, alignment marks are correspondingly provided on the outer walls of the upper rotary sliding sleeve and that of the lower rotary sliding sleeve.

The invention provides another embodiment that the upper rotary sliding sleeve is integrally formed with the chassis or connected and fixed by a fixing component, the lower rotary sliding sleeve is sleeved outside the upper rotary sliding sleeve, and the lower rotary sliding sleeve is relatively rotated with the upper rotary sliding sleeve and the chassis to realize locking and unlocking of the center rod.

Further, sliding groove is provided on the side wall of lower rotary sliding sleeve along the relative rotation direction of upper rotary sliding sleeve and lower rotary sliding sleeve, the sliding groove is arranged with a limiting rod inserted into the upper rotary sliding sleeve, and the center rod is extended into the lower rotary sliding sleeve along the chassis and the upper rotary sliding sleeve.

Further, a limiting ring is arranged on inner bottom surface of the lower rotary sliding sleeve, one side of the limiting ring is provided with a first limiting plate attached to the bottom surface of the upper rotary sliding sleeve, the bottom of the upper rotary sliding sleeve is provided with a second limiting plate, and a second spring is provided between the first limiting plate and the second limiting plate; a bump is arranged on the first limiting plate, one end of the spring is clamped on the bump, the other end thereof is attached to the second limiting plate.

Further, the limiting rod comprises an inserting rod inserted into the upper rotary sliding sleeve and a sliding block arranged in the sliding groove, a limiting block connected to inner wall of the upper rotary sliding sleeve and outer wall of the second through hole is arranged in the upper rotary sliding sleeve, an inserting hole corresponding to the inserting rod is arranged on the limiting block, the diameter of the sliding block is greater than that of the inserting rod, the sliding block is flush with the sliding groove.

Further, a center rod limiting plate is provided on the bottom of the lower through hole, the bottom of the center rod limiting plate is connected with a water-outlet channel through a drain hole, the water-outlet channel penetrates through the lower rotary sliding sleeve and is connected to outside.

Further, a skid resistance part is provided on the outer wall of the lower rotary sliding sleeve, and a part connecting hole is provided on the bottom of the lower rotary sliding sleeve.

By adopting the above technical schemes, the invention has the following advantages: in the invention, by the center rod and upper and lower rotary sliding sleeve with elastic member, and through holes and the accommodating grooves for pressing or releasing the elastic member, the structure can be unlocked by rotation and pull-down, and in the invention, the upper rotary sliding sleeve can be integrally formed with the lower rotary sliding sleeve, or the upper rotary sliding sleeve can be integrally formed with the chassis, which reduces the number of parts, facilitates assembly, is durable, easy to use, also operates smoothly and safely, avoids the danger of hand clamping, and is convenient for adding accessories.

BRIEF DESCRIPTION OF ACCOMPANYING DRAWINGS

In order to describe the technical schemes of the embodiments of the invention more clearly, the accompanying drawings required in the embodiments will be briefly described below, and it should be understood that the following drawings only illustrate some embodiments of the invention, therefore, the accompanying drawings can not be regarded as a limitation of the scope of the invention, for those skilled in the art, other related drawings can also be obtained from the accompanying drawings without creative effort.

Figure 1:
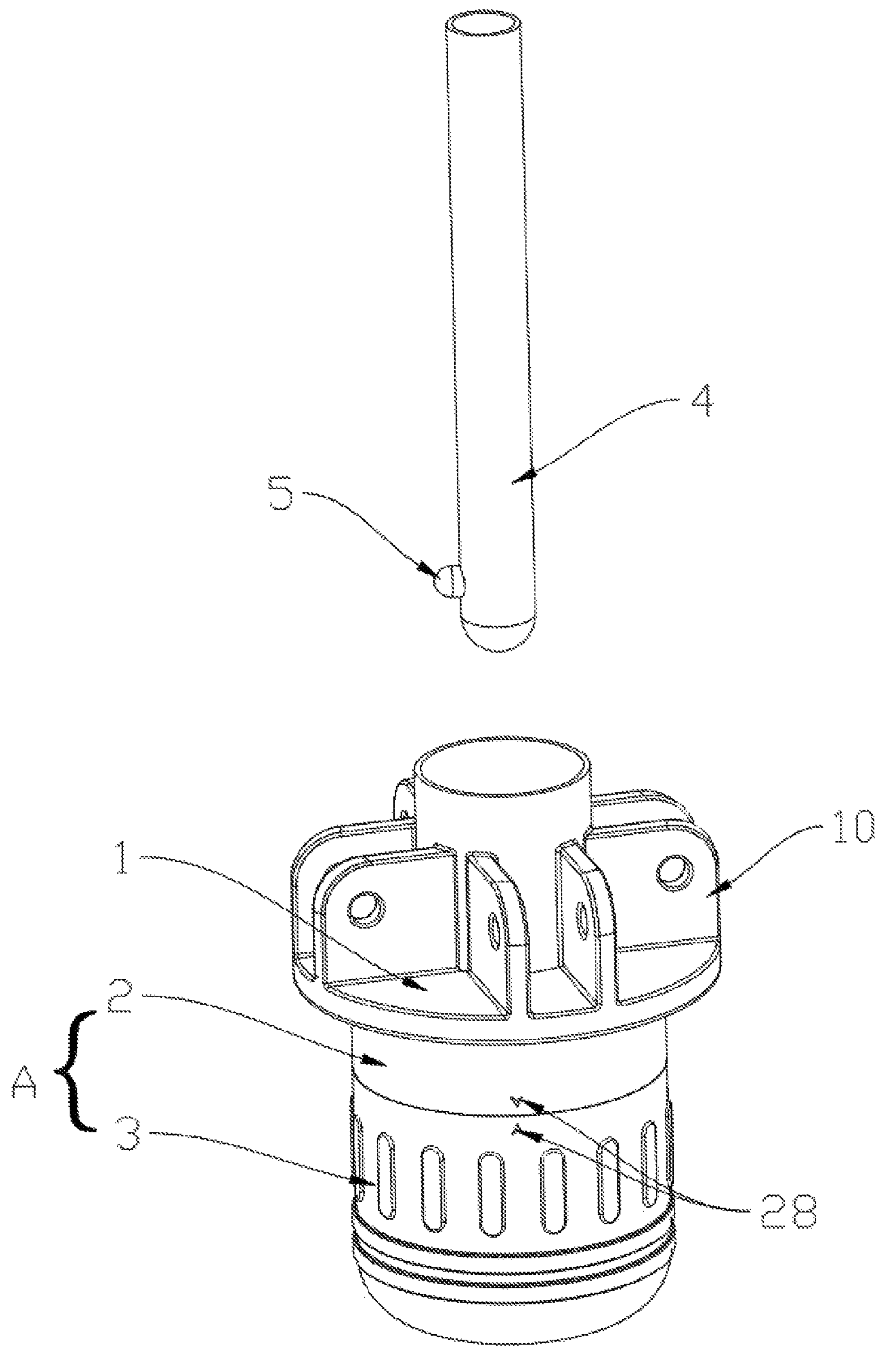
FIG. 1 shows the structure of embodiment 1 of a rotating locking structure in the invention.

In the accompanying drawings: A rotary sliding sleeve, B second through hole, 1 chassis, 2 upper rotary sliding sleeve, 3 lower rotary sliding sleeve, 4 center rod, 5 elastic member, 6 first through hole, 7 upper through hole, 8 lower through hole, 9 accommodating groove, 10 rib fixing member, 11 buckle, 12 limiter mounting hole, 13 funnel through hole, 14 buckle mounting hole, 15 buckle chute, 16 spring first mounting hole, 17 upper baffle, 18 spring second mounting hole, 19 limiter mounting groove, 20 first fixing member mounting hole, 21 reinforcing ribs, 22 fixing member column, 23 second fixing member mounting hole, 24 boss, 25 center rod limiting plate, 26 drain hole, 27 water-outlet channel, 28 alignment marks, 29 skid resistance part, 30 part connecting hole, 31 sliding groove, 32 limiting rod, 3201 inserting rod, 3202 sliding block, 33 limiting block, 34 inserting hole, 35 limiting ring, 36 limiting ring, 37 second limiting plate, 38 second spring, 39 bump, 40 observation window.

SPECIFIC EMBODIMENT OF THE INVENTION

In order to make the purpose, technical schemes and advantages of the embodiments of the invention more clear, the technical schemes of the embodiments of the invention will be described clearly and completely in combination with the accompanying drawings of the embodiments of the invention. Obviously, the described embodiments are part of the embodiments of the invention rather than all embodiments of the invention. The components of embodiments of the invention usually described and shown herein may be arranged and designed in various configurations.

Therefore, the following detailed description of embodiments of the invention provided in the accompanying drawings is not intended to limit the scope of the invention for which protection is required, but to represent only specific embodiments of the invention. Based on the embodiments of the invention, all other embodiments obtained by ordinary technical personnel skilled in the art without making creative labor are covered by the invention.

It should be noted that similar labels and letters indicate similar items in the accompanying drawings below, therefore, once an item has been defined in one drawing, it does not need to be further defined and interpreted in subsequent drawings.

It should be understood that, in the description of the invention, the orientations or positional relationships indicated by the terms "center", "upper", "lower", "left", "right", "vertical", "horizontal", "inside", "outside", "front", "back" etc., are based on the orientations or positional relationships shown in the drawings, or are conventional used orientations or positional relationships when the product of the invention in use, and these are only for the convenience of describing the invention and simplifying the description, and does not indicate or imply that the device or element referred to must have a specific orientation, structure and operation, therefore, the terms cannot be understood as a limitation to the invention. In addition, the terms "first", "second" and "third" are used for descriptive purposes, and cannot be understood as indicating or implying relative importance.

Furthermore, the presence of the terms "horizontal", "vertical", "overhanging" etc. does not imply that the component is required to be absolutely horizontal or overhang, but rather may be slightly inclined. For example, "horizontal" simply means that the direction is more horizontal than "vertical", and does not mean that the structure must be completely horizontal, but can be slightly inclined.

In the description of the embodiments of the invention, "plurality" represents at least two.

In the invention, the terms of "arrange", "mount", "link", "connect" and etc., should be generally understood unless there are specific restrictions or stipulations. For example, the "connect" may refer to fixed connection, detachable connection or integral connection; the "connect" may also refer to mechanical connection or electrical connection; the means of "connect" may be directly connected or indirectly connected through an intermediate medium, and may be internal communication between the two elements. For those skilled in the art, the specific meaning of the above terms in the invention can be understood according to the specific situation.

Embodiment 1

Figure 2:
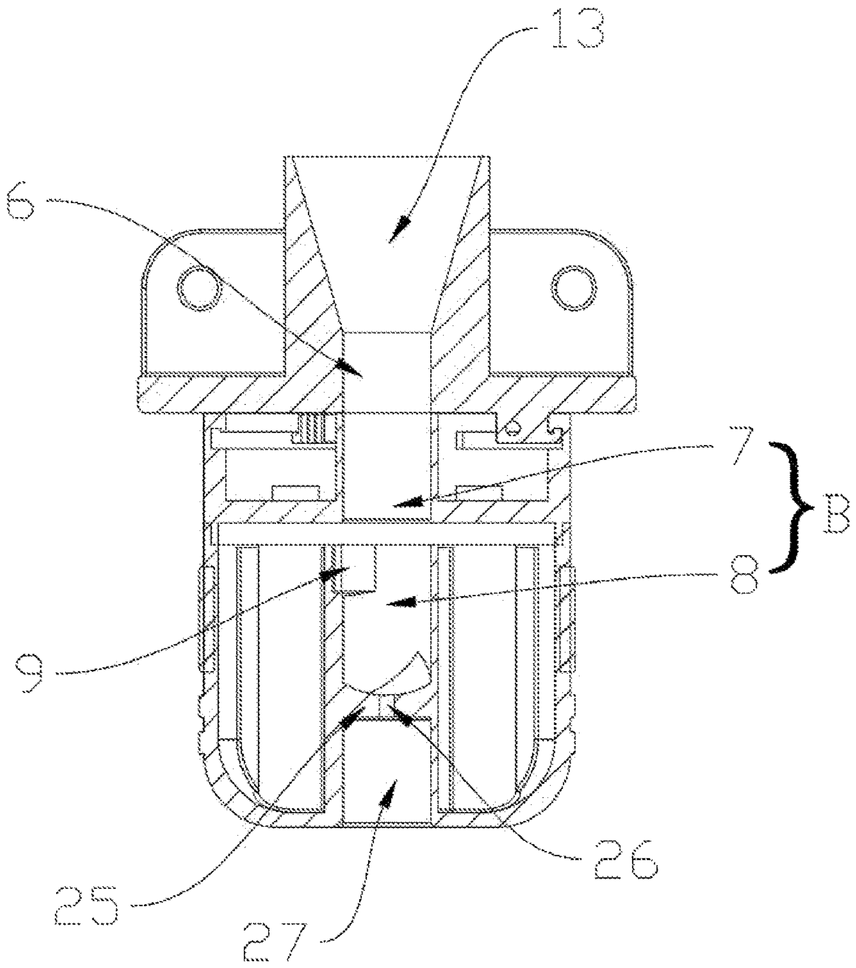
FIG. 2 shows the inner structure of embodiment 1 of a rotating locking structure in the invention.
Figure 9:
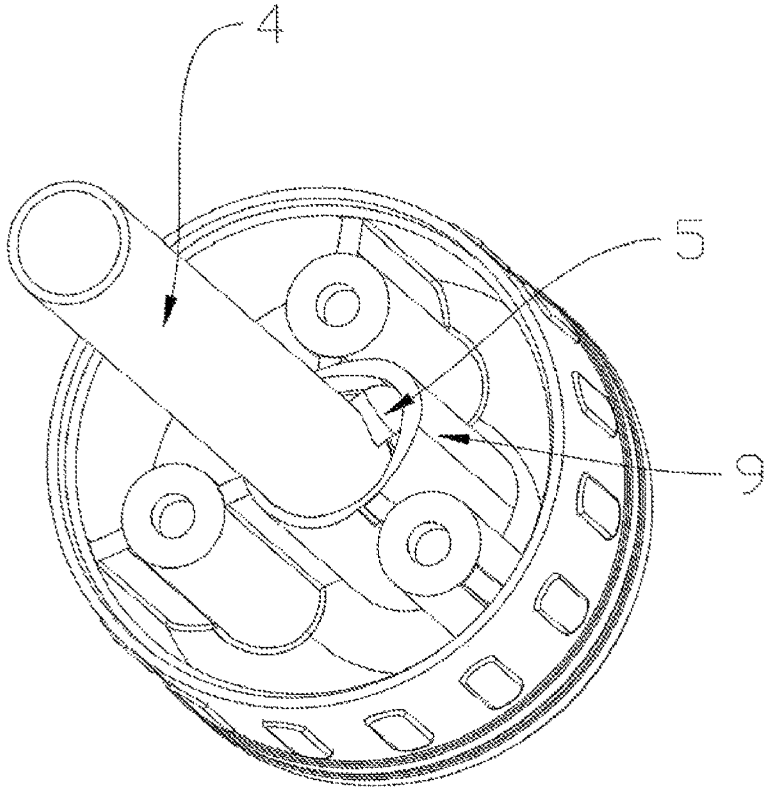
FIG. 9 shows the unlocking state of center rod in embodiment 1 of a rotating locking structure in the invention.
Figure 10:
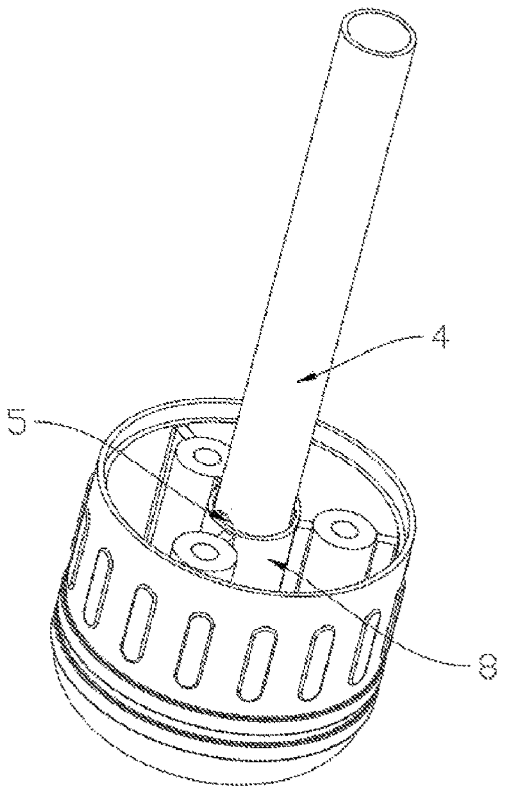
FIG. 10 shows the unlocking state of center rod in embodiment 1 of a rotating locking structure in the invention.
Figure 11:
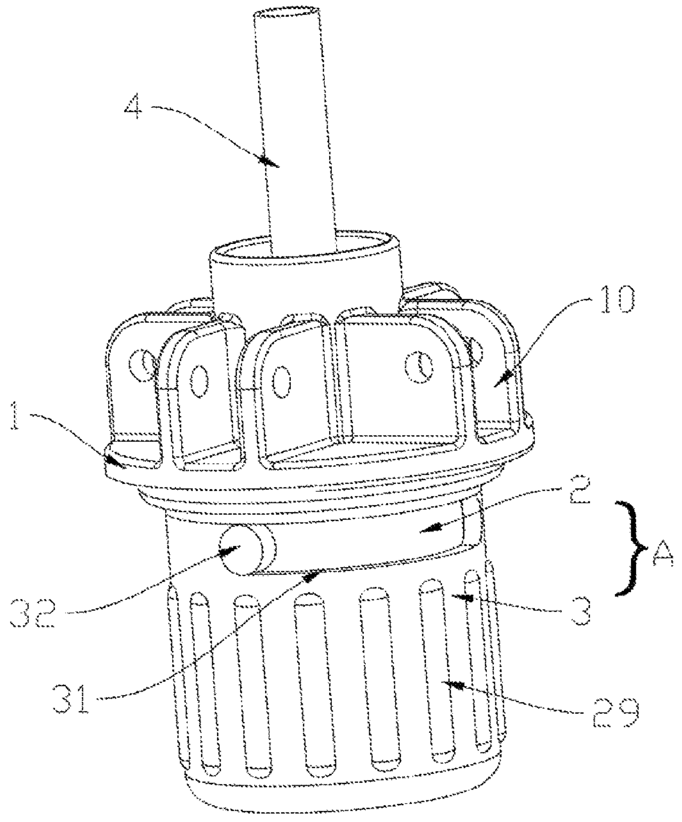
FIG. 11 shows the structure of embodiment 3 of a rotating locking structure in the invention.

Combined with FIG. 1 and FIG. 2, the invention discloses a rotating locking structure, comprising a chassis 1, rotary sliding sleeve A and a center rod 4, the top of the rotary sliding sleeve is circumferentially and slidely connected with the bottom of the chassis 1, and the center rod 4 is extended into the rotary sliding sleeve along the top of the chassis 1; an elastic member 5 is provided at one side on the bottom of the center rod 4, the elastic member 5 is exposed outside the center rod 4 when there is no external force, and the elastic member 5 is concealed in the center rod 4 when squeezed by an external force, wherein the elastic member 5 can be jumpers or springs and buttons; the chassis 1 and the rotary sliding sleeve A are respectively provided with a first through hole 6 and a second through hole B that make the elastic member concealed in the center rod; in the embodiment, the rotary sliding sleeve A comprises upper rotary sliding sleeve 2 and lower rotary sliding sleeve 3 which are assembled by fixed components, wherein the second through hole B comprises an upper through hole 7 arranged on the upper rotary sliding sleeve 2 and a lower through hole 8 arranged on the lower rotary sliding sleeve 3;

Specifically, one side of the lower through hole 8 is provided with an elastic member accommodating groove 9, and outer side wall of the accommodating groove 9 is integrated with the lower through hole, the inner side wall of the accommodating groove 9 and the side wall of the lower through hole 8 are arc-transitionally connected, and a boss 24 is provided at the lower part of the accommodating groove 9; as shown in FIG. 9, the elastic member 5 is ejected from the accommodating groove 9, thereby the center rod 4 is locked with the lower rotary sliding sleeve 3 and the upper rotary sliding sleeve 2; as shown in FIG. 10 when the lower rotary sliding sleeve 3 and the upper rotary sliding sleeve 2 rotate to make the side wall of the accommodating groove 9 press the elastic member into the center rod 4, the center rod 4 and the lower rotary sliding sleeve 3 and the upper rotary sliding sleeve 2 are unlocked.

Figure 3:
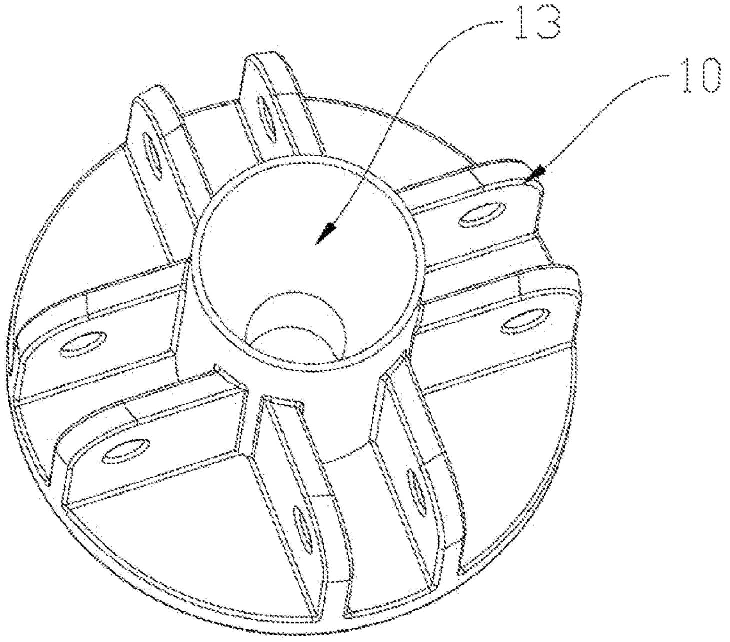
FIG. 3 shows the top structure of chassis in embodiment 1 of a rotating locking structure in the invention.
Figure 4:
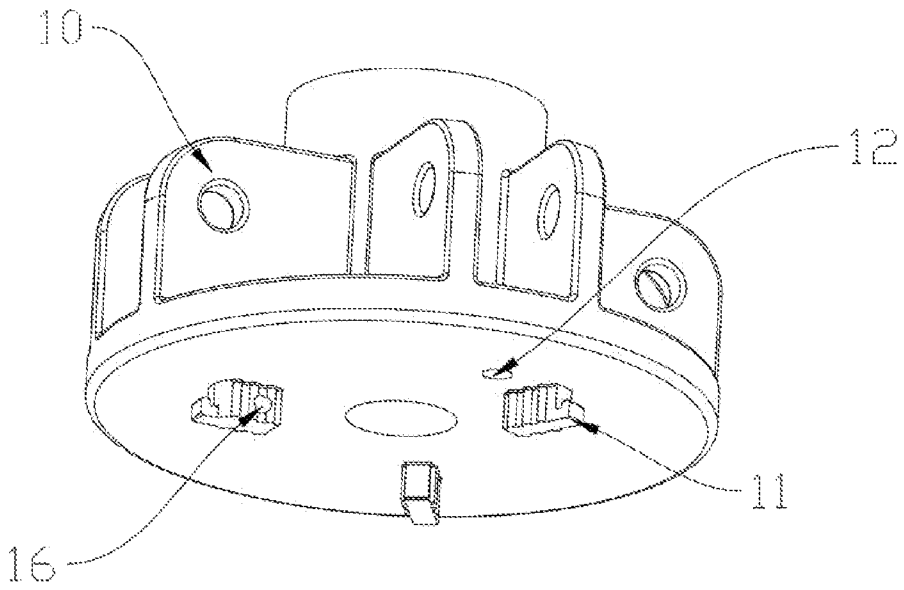
FIG. 4 shows the bottom structure of chassis in embodiment 1 of a rotating locking structure in the invention.

Specifically, combined with FIG. 3 and FIG. 4, the top of the first through hole 6 in the chassis is provided with a funnel through hole 13 with an inner diameter gradually increases from bottom to top, which facilitates the inserting of the center rod 4; the top of the chassis 1 is provided with multiple sets of rib fixing members 10, in the invention, four sets of rib fixing members 10 are provided to connect four ribs, the rib fixing members 10 are respectively provided with fixing holes for fixing the ribs; the bottom of the chassis 1 is provided with multiple buckles 11 that cooperate with the upper rotary sliding sleeve 2, in the embodiment, the buckles 11 are j-shaped to make the connection more stable, and the bottom of the chassis is also provided with a limiter mounting hole 12.

Figure 5:
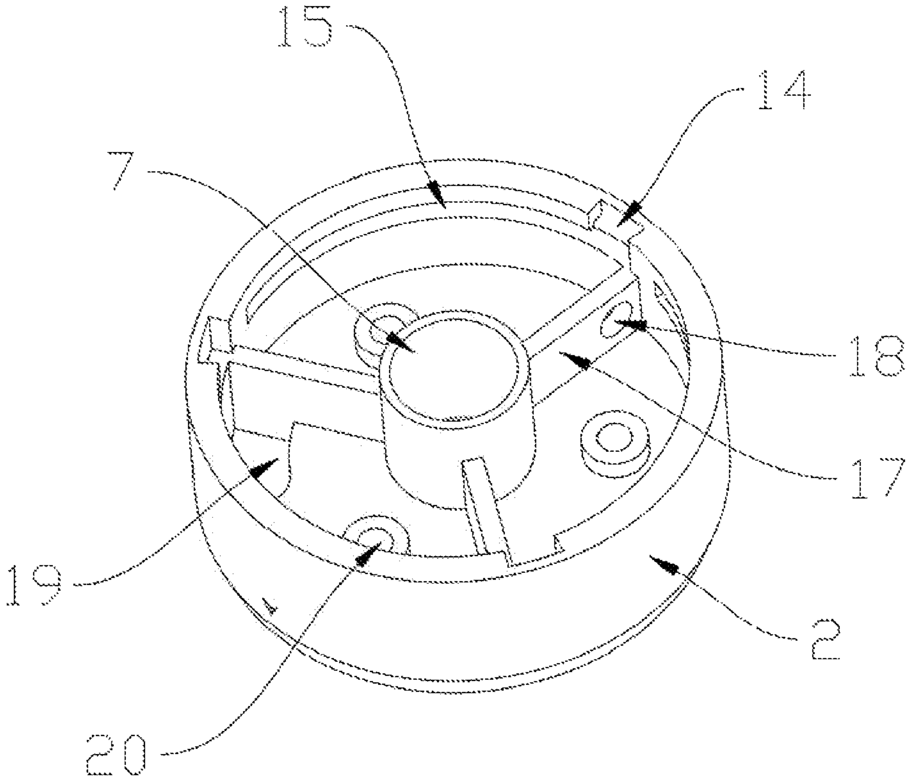
FIG. 5 shows the top structure of upper locking sleeve in embodiment 1 of a rotating locking structure in the invention.
Figure 6:
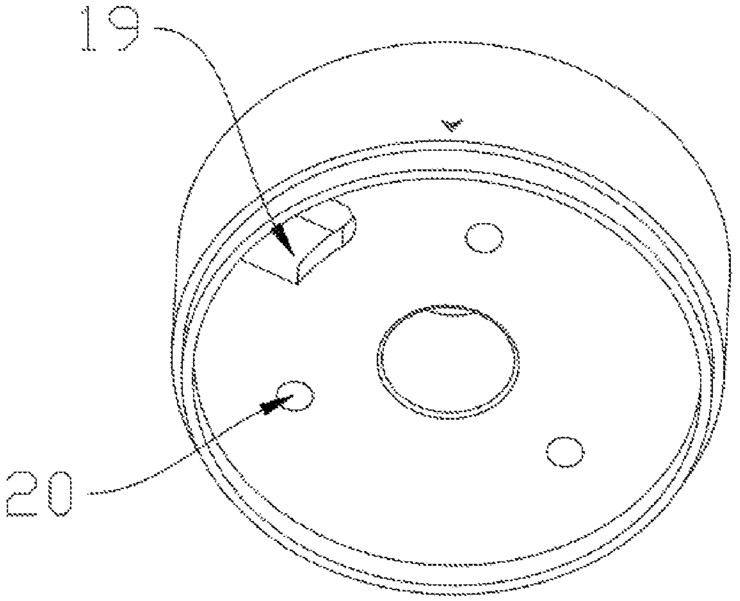
FIG. 6 shows the bottom structure of upper locking sleeve in embodiment 1 of a rotating locking structure in the invention.

As shown in FIG. 5 and FIG. 6, the top of the upper rotary sliding sleeve 2 is provided with buckle mounting holes 14 corresponding to the number of buckles 11, the top of the buckle bottom thereof is provided with a buckle sliding groove 15 along the inner wall of the upper rotary sliding sleeve 2, thereby the buckle 11 enters the buckle sliding groove 15 from the buckle mounting hole 14 and can circumferentially slide along the buckle sliding groove 15.

A limiter mounting groove 19 is provided on the bottom surface of the upper rotary sliding sleeve 2 and penetrates the upper rotary sliding sleeve, and the limiter mounting groove 19 is an elongated sliding hole arranged along the inner wall of the upper rotary sliding sleeve 2, because the buckle 11 is clamped in the buckle mounting hole 14 and can slide along the buckle sliding groove 15, when the limiter mounting groove 19 rotates to correspond to the limiter mounting hole 12, a limiter that extends into the limiter mounting groove 19 is arranged inside the limiter mounting hole 12.

A spring first mounting hole 16 is provided on the buckle 11, an upper baffle 17 is provided between the inner wall of the upper rotary sliding sleeve 2 and the outer wall of the upper through hole 7, the upper baffle 17 is provided with a spring second mounting hole 18, a reset spring is provided between the spring first mounting hole 16 and the spring second mounting hole 18, thereby one end of spring is arranged on the buckle 11 on the bottom of the chassis 1, the other end thereof is arranged on the upper baffle 17 on the upper rotary sliding sleeve 2; when locking structure is unlocked, the rotary sliding sleeve rotates under the action of external forces and drives spring to be stretched in the process of unlocking; after unlocking, the external force disappears, and the rotary sliding sleeve is pulled by the pulling force of first spring in reverse rotation until the upper baffle 17 meets the limiter and completes the reset.

Figure 7:
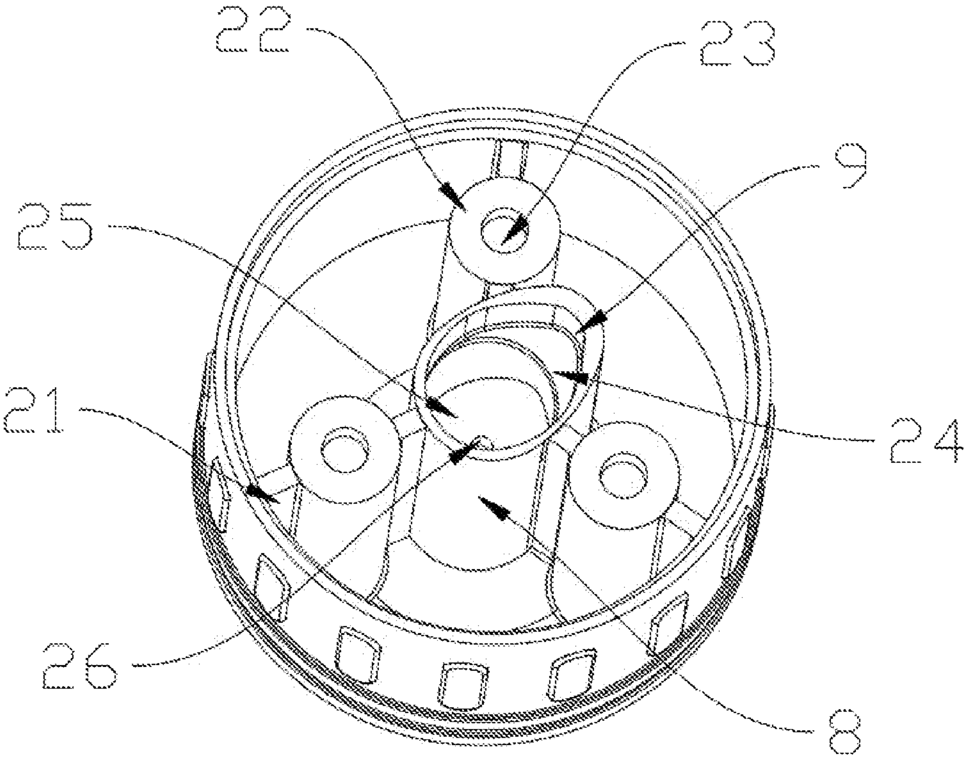
FIG. 7 shows the top structure of lower locking sleeve in embodiment 1 of a rotating locking structure in the invention.
Figure 8:
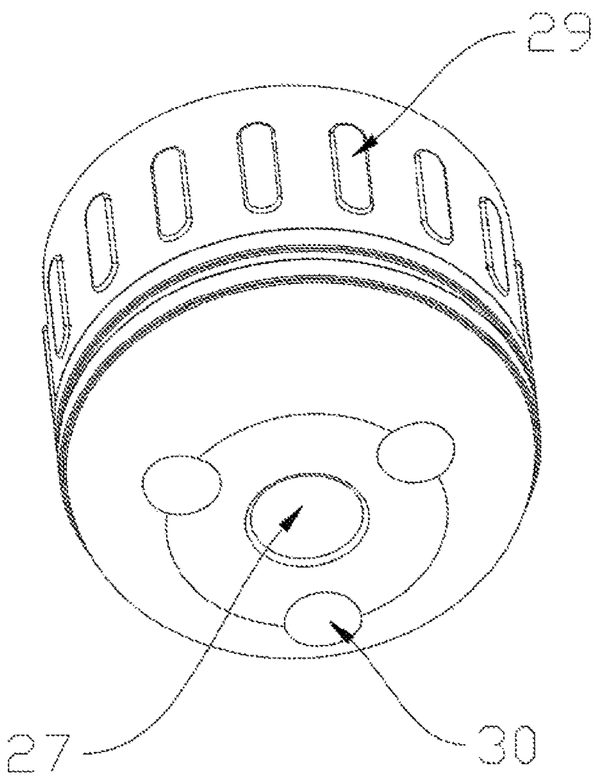
FIG. 8 shows the bottom structure of lower locking sleeve in embodiment 1 of a rotating locking structure in the invention.

The bottom surface of the upper rotary sliding sleeve 2 is provided with a first fixing member mounting hole 20 mounted and fixed with the lower rotary sliding sleeve 3; as shown in FIG. 7 and FIG. 8, reinforcing ribs 21 are provided between the inner wall of the lower rotary sliding sleeve 3 and the outer wall of the lower through hole 8, the reinforcing rib 21 is provided with a fixing member column 22 corresponding to the first fixing member mounting hole 20, and a second fixing member mounting hole 23 is provided in the fixing member column 22, in the embodiment, screws or bolts can be used as the fixing member, and the upper and lower rotary sliding sleeve can be fixed through the second and first fixing member mounting hole, and interlocking rings are provided between the bottom of the upper rotary sliding sleeve 2 and the top of the lower rotary sliding sleeve 3 to limit the relative displacement during assembly.

A center rod limiting plate 25 is provided on the bottom of the lower through hole 8, the center rod limiting plate 25 is a downward convex arc plate, which is convenient for sewage flow, the bottom of the center rod limiting plate 25 is connected with a water-outlet channel 27 through a drain hole 26, the water-outlet channel 27 penetrates through the lower rotary sliding sleeve 3 and is connected to outside.

Alignment marks 28 are correspondingly provided on the outer walls of the upper rotary sliding sleeve 2 and that of the lower rotary sliding sleeve 3, which is convenient to locate the fixing member mounting hole during assembly. The alignment marks 28 can be depressions or projections, patterns or stickers on side walls; a skid resistance part 29 is provided on the outer wall of the lower rotary sliding sleeve 3, the skid resistance part 29 can be convex or concave pattern; and a part connecting hole 30 is provided on the bottom of the lower rotary sliding sleeve 3, which can arrange hook, lifting ring, thread and port cover for connecting accessories.

Embodiment 2

The difference between the embodiment 2 and embodiment 1 is that in the embodiment, the upper rotary sliding sleeve 2 and the lower rotary sliding sleeve 3 are integrated, that is, the rotary sliding sleeve A is a whole, and the assembly between the rotary upper sliding sleeve 2 and the lower rotary sliding sleeve 3 is removed to reduce the working procedure.

In the implementation of the invention, first the center rod is inserted into the first through hole of the chassis, and the inner wall of the first through hole extrude the elastic member into the center rod, and the center rod continues to pass through the upper through hole of the upper rotary sliding sleeve, and ejected out from the accommodating groove of the lower rotary sliding sleeve to realize the locking of the center rod and the rotary sliding sleeve;

When unlocking, by rotating the upper and lower sliding sleeve, the elastic member is squeezed by the side wall of the accommodating groove into the center rod, simultaneously, the rotary sliding sleeve is pulled down to release the center rod to complete the unlocking, the limiting plate in the sliding sleeve is used to prevent the center rod from underneath pass when the sliding sleeve is accidentally pushed up in the process of unlocking.

Embodiment 3

As shown in FIG. 11-14, the difference between the embodiment 3 and the embodiment 1 is that in the embodiment, the upper rotary sliding sleeve 2 is integrated with the chassis 1 or connected and fixed by a fixing component, the lower rotary sliding sleeve 3 is sleeved on the upper rotary sliding sleeve 2; the lower rotary sliding sleeve 3, the upper rotary sliding sleeve 2 and the chassis 1 are relatively rotated to realize locking and unlocking of the center rod.

Figure 12:
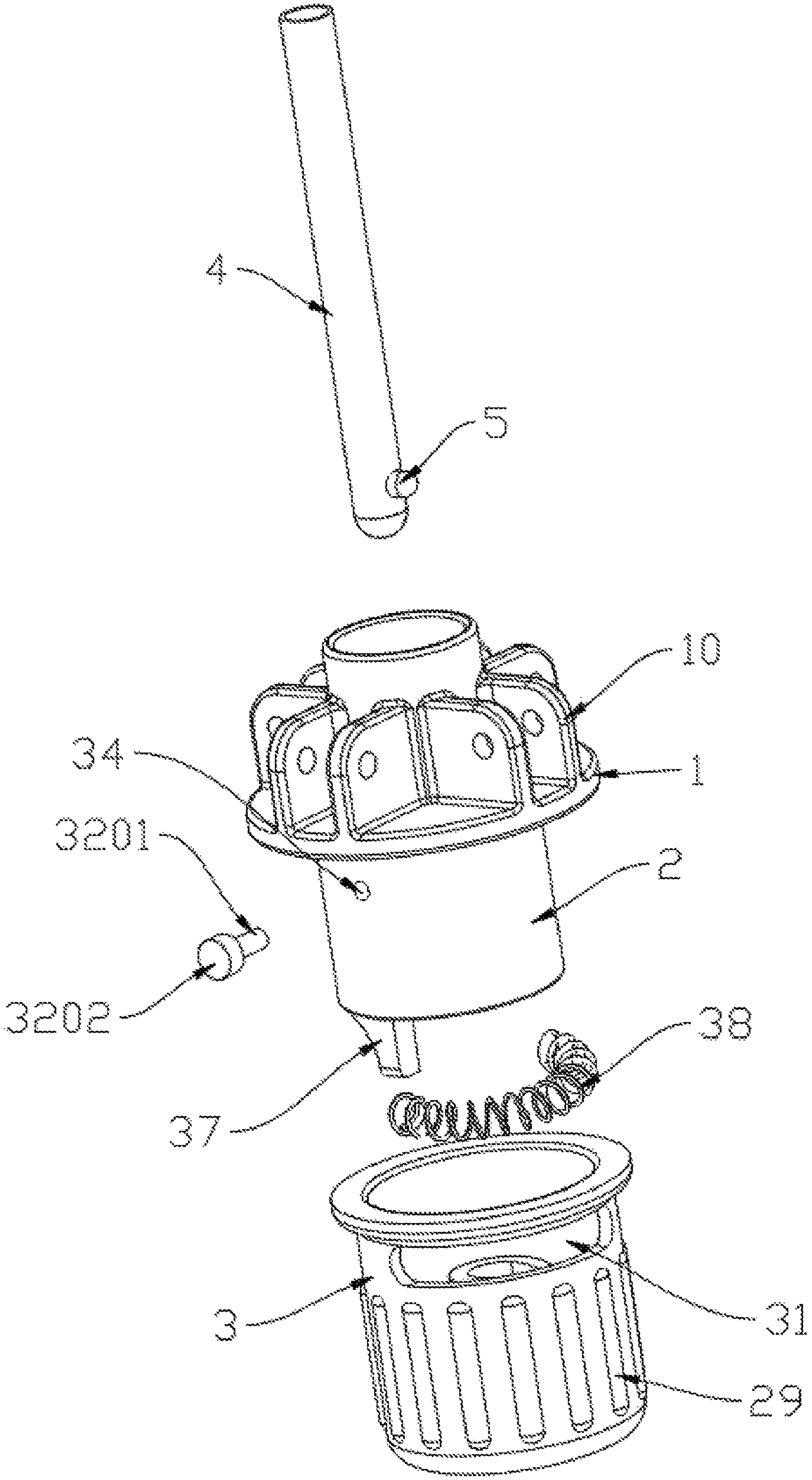
FIG. 12 shows the breakdown structure of embodiment 3 of a rotating locking structure in the invention.
Figure 13:
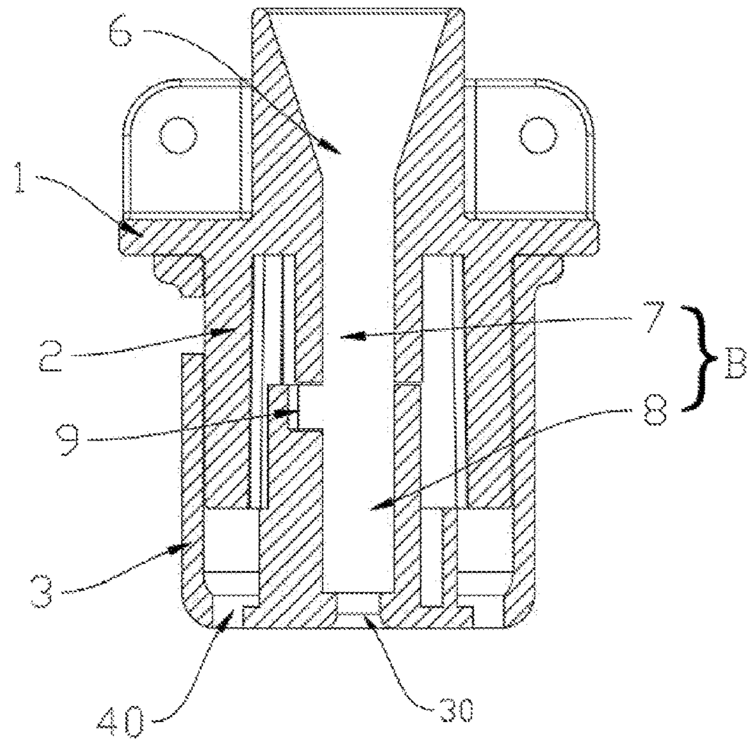
FIG. 13 shows the inner structure of rotary sliding sleeve in embodiment 3 of a rotating locking structure in the invention.
Figure 14:
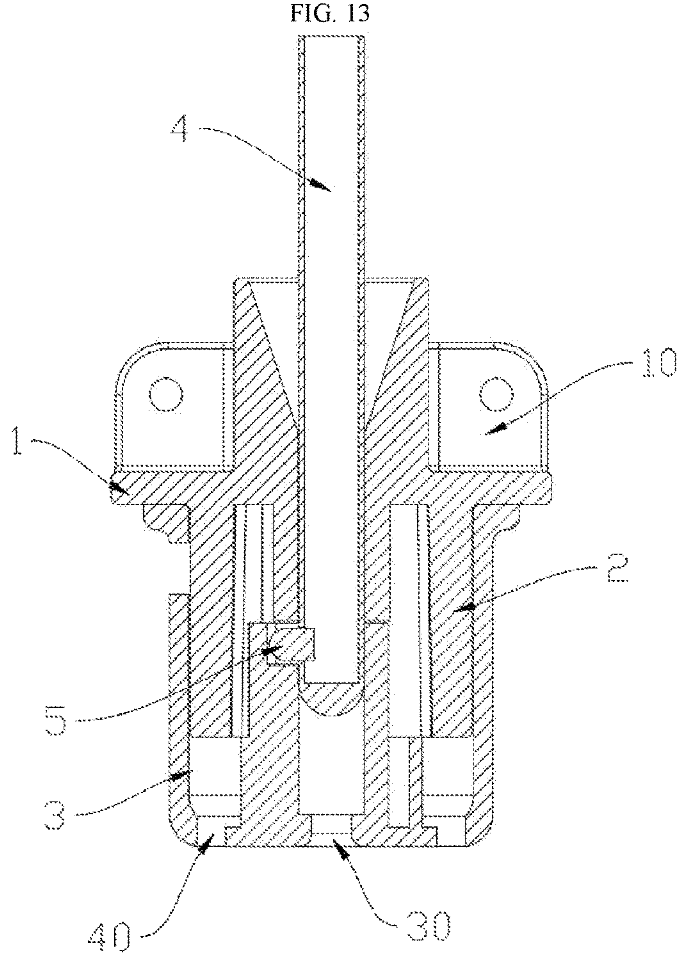
FIG. 14 shows the inner structure of embodiment 3 of a rotating locking structure in the invention.
Figure 15:
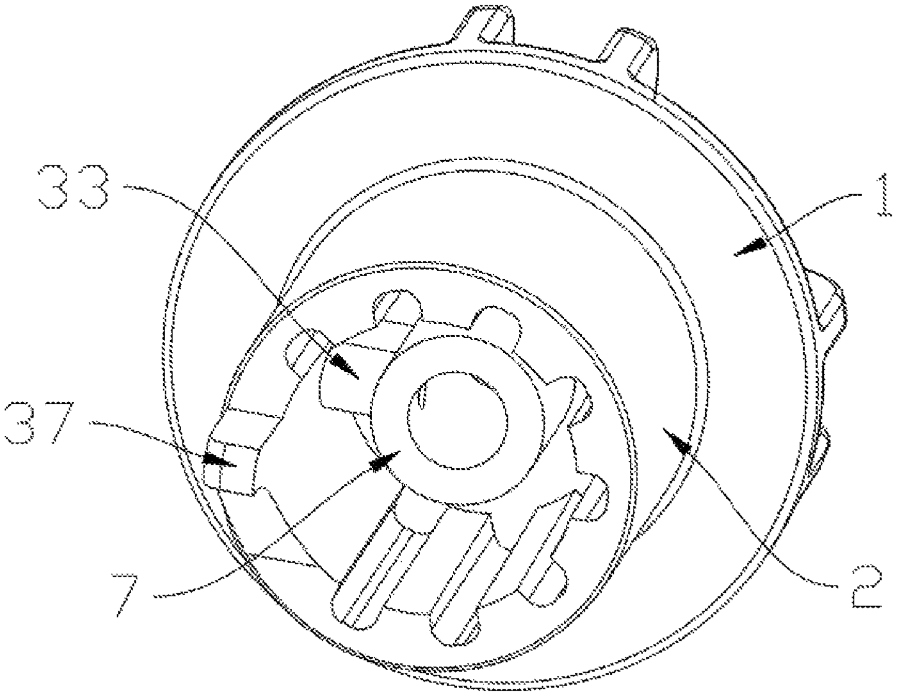
FIG. 15 shows the bottom structure of upper rotary sliding sleeve in embodiment 3 of a rotating locking structure in the invention.

As shown in FIG. 12, sliding groove 31 is provided on the side wall of lower rotary sliding sleeve 3 along the relative rotation direction of upper rotary sliding sleeve 2 and lower rotary sliding sleeve 3; the sliding groove 31 is arranged with a limiting rod 32 inserted into the upper rotary sliding sleeve 2; the limiting rod 32 comprises an inserting rod 3201 inserted into the upper rotary sliding sleeve 2 and a sliding block 3202 arranged in the sliding groove 31, as shown in FIG. 15, a limiting block 33 connected to inner wall of the upper rotary sliding sleeve 2 and outer wall of the second through hole 9 is arranged in the upper rotary sliding sleeve 2, an inserting hole 34 corresponding to the inserting rod 3201 is arranged on the limiting block 33; the diameter of the sliding block 32 is greater than that of the inserting rod 3201, the sliding block 3202 is flush with the sliding groove 31 to facilitate the relative rotation of the lower rotary sliding sleeve 3 and the upper rotary sliding sleeve 2.

Figure 17:
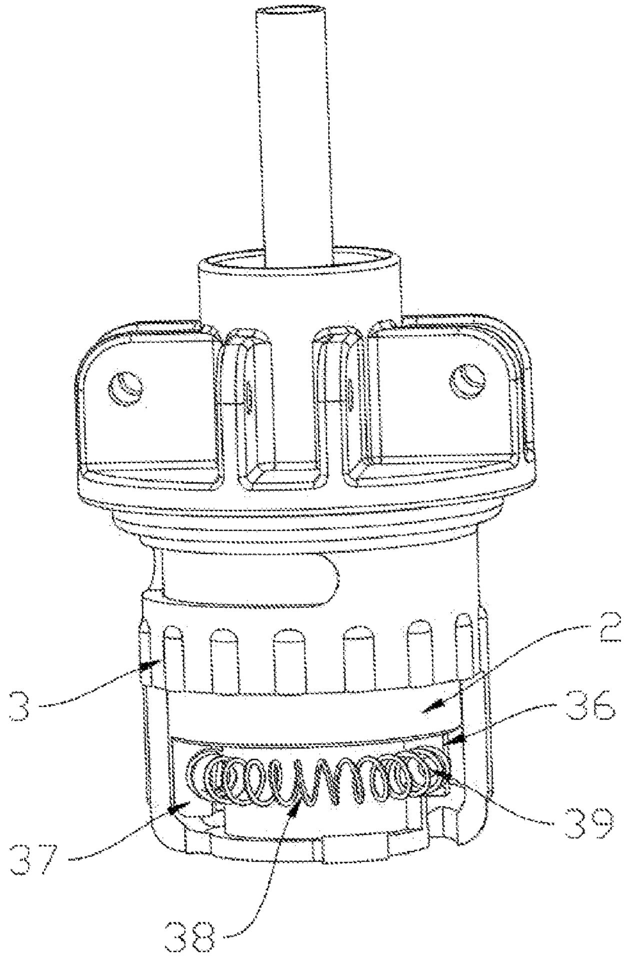
FIG. 17 shows the structure of second spring in embodiment 3 of a rotating locking structure in the invention.
Figure 18:
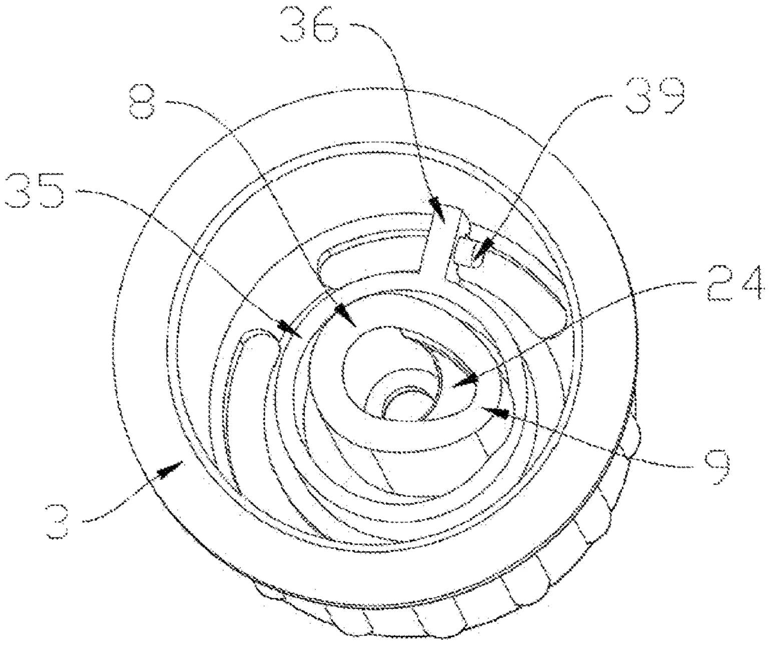
FIG. 18 shows the structure of accommodating groove in embodiment 3 of a rotating locking structure in the invention.
Figure 19:
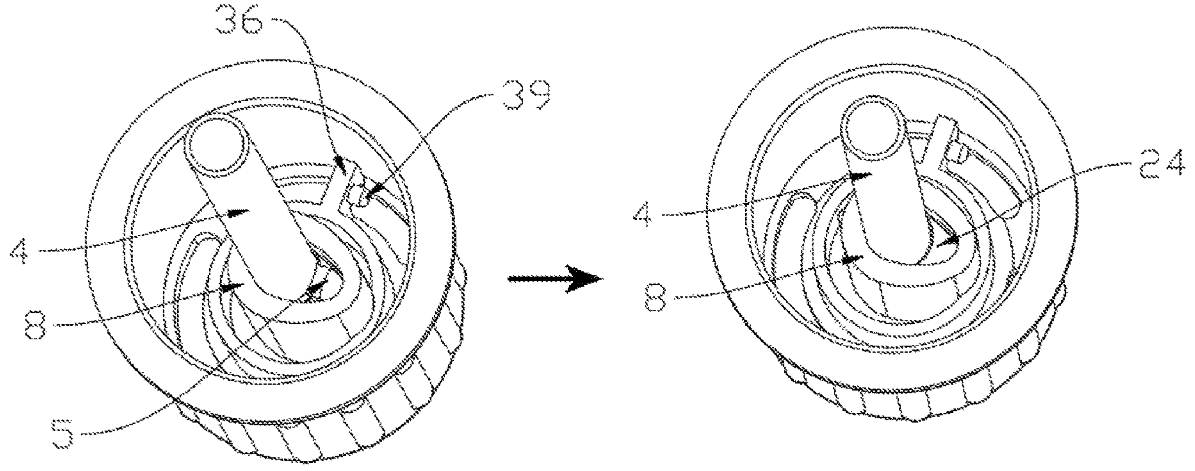
FIG. 19 shows the unlocking state of center rod in embodiment 3 of a rotating locking structure in the invention.
Figure 20:
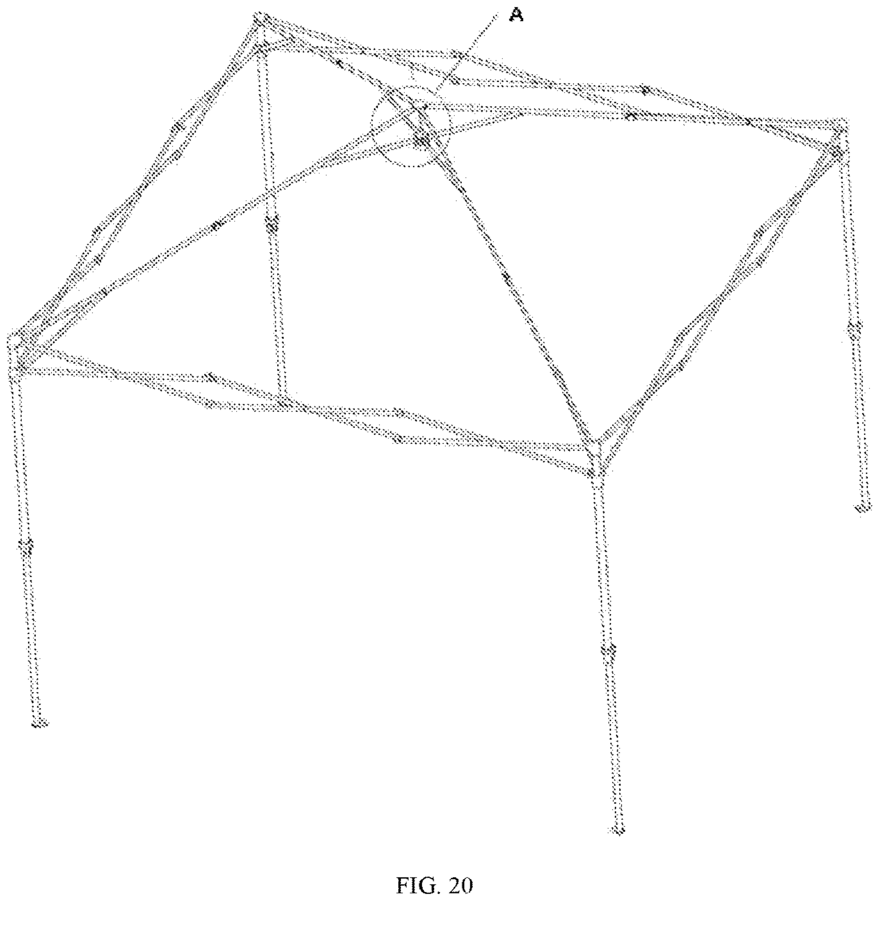
FIG. 20 shows the mounting position (showed as A in FIG. 20) of a rotating locking structure in the invention.

As shown in FIG. 18, a gap is provided between the bottom surface of the upper rotary sliding sleeve 2 and the inner bottom surface of the lower rotary sliding sleeve 3, and a limiting ring 35 sleeved outside the lower through hole 8 is arranged on inner bottom surface of the lower rotary sliding sleeve 3, one side of the limiting ring 35 is provided with a first limiting plate 36 attached to the bottom surface of the upper rotary sliding sleeve 2, as shown in FIG. 15, the bottom of the upper rotary sliding sleeve 2 is provided with a second limiting plate 37, and a second spring 38 is provided between the first limiting plate 36 and the second limiting plate 37, as shown in FIG. 17, a bump 39 is arranged on the first limiting plate 36, one end of the spring is clamped on the bump 39, the other end thereof is attached to the second limiting plate 37; when the external force drives the rotary sliding sleeve 3 to rotate relative to the upper rotary sliding sleeve 2, the second spring between the first limiting plate 36 and the second limiting plate 37 is compressed, which plays the role of reset after unlocking.

Figure 16:
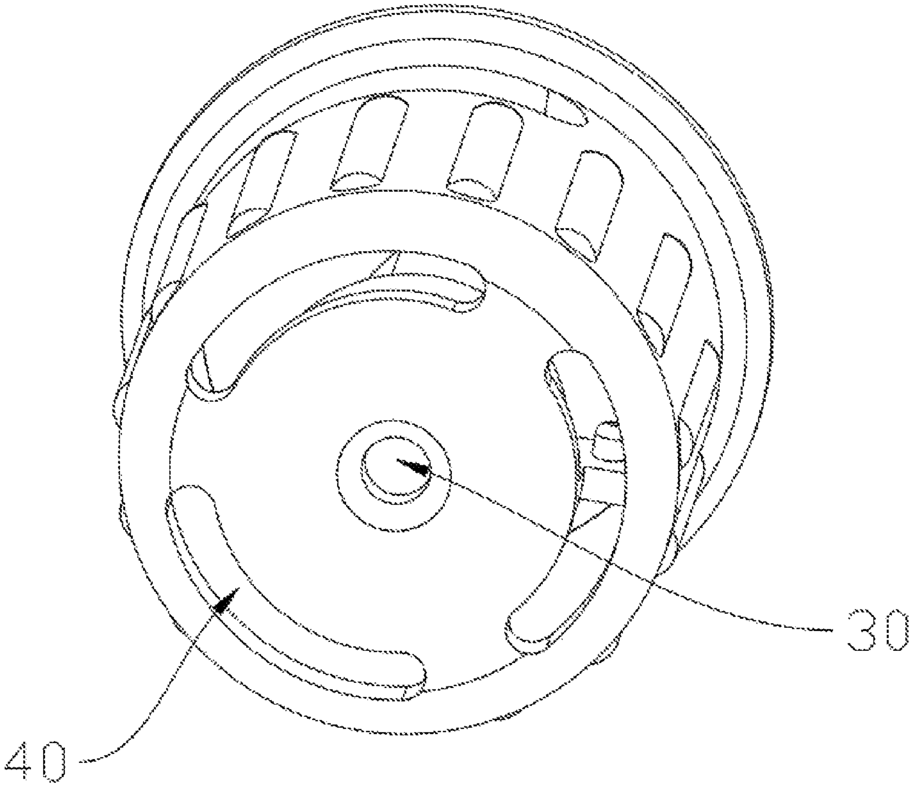
FIG. 16 shows the structure of lower rotary sliding sleeve in embodiment 3 of a rotating locking structure in the invention.

As shown in FIG. 16, the bottom of the lower through hole 8 penetrates through the bottom of the lower rotary sliding sleeve 3 and is provided with part connecting hole 30 for hanging lights or other accessories, and the outer bottom of the lower rotary sliding sleeve 3 is circumferentially arranged with several observation windows 40, which are easy to observe springs and can save costs.

The specific implementation process of the embodiment is the same as that of embodiment 1, first the center rod is inserted into the first through hole of the chassis, and the inner wall of the first through hole extrude the elastic member into the center rod, and the center rod continues to pass through the upper through hole of the upper rotary sliding sleeve, and ejected out from the accommodating groove of the lower rotary sliding sleeve to realize the locking of the center rod and the rotary sliding sleeve.

When unlocking, by rotating the upper and lower sliding sleeve, the elastic member is squeezed by the side wall of the accommodating groove into the center rod, at this time the rotary sliding sleeve is pulled down to release the center rod to complete the unlocking, simultaneously, the second spring between the first limiting plate 36 and the second limiting plate 37 is compressed, which plays the role of reset after unlocking.

The above description of the invention and embodiments thereof are not restricted, and the accompanying drawings are only one of the implementation modes of the invention, and the actual structure is not limited thereto. In general, if the common technical personnel skilled in the art are inspired by the invention, without deviating from the purpose of the invention, and without creatively designing the structure and embodiment similar to the technical scheme, shall fall within the protection scope of the invention.

What is claimed is:

1. A center lock structure, comprising: a chassis, rotary sliding sleeve and a center rod, a top of the rotary sliding sleeve is circumferentially and slidably connected with the chassis, and the center rod is extended into the rotary sliding sleeve along the top of the chassis, a top of the chassis is provided with multiple sets of rib fixing members; an elastic member is provided at one side on a bottom of the center rod, the elastic member is exposed outside the center rod when there is no external force, and the elastic member is concealed in the center rod when squeezed by an external force; the chassis and the rotary sliding sleeve are respectively provided with a first through hole and a second through hole that make the elastic member concealed in the center rod, and a top of the first through hole is provided with a funnel through hole with an inner diameter gradually increasing from bottom to top, the second through hole is provided with an elastic member accommodating groove when the rotary sliding sleeve rotates to make a side wall of the accommodating groove press the elastic member into the center rod, the center rod and the rotary sliding sleeve are unlocked.

2. The center lock structure of claim 1, wherein the rotary sliding sleeve comprises an upper rotary sliding sleeve and a lower rotary sliding sleeve, the second through hole comprises an upper through hole arranged on the upper rotary sliding sleeve and a lower through hole arranged on the lower rotary sliding sleeve, the accommodating groove is arranged at a top of the lower through hole.

3. The center lock structure of claim 2, wherein the upper rotary sliding sleeve and the lower rotary sliding sleeve are integrally formed or connected and fixed by a fixing component.

4. The center lock structure of claim 3, wherein a limiter mounting groove is provided on a bottom surface of the upper rotary sliding sleeve and penetrates the upper rotary sliding sleeve, and the limiter mounting groove is an elongated sliding hole arranged along the inner wall of the upper rotary sliding sleeve.

5. The center lock structure of claim 2, wherein alignment marks are correspondingly provided on an outer wall of the upper rotary sliding sleeve and that of the lower rotary sliding sleeve.

6. The center lock structure of claim 2, wherein a limiting rod comprises an inserting rod inserted into the upper rotary sliding sleeve and a sliding block arranged in the sliding groove, a limiting block connected to an inner wall of the upper rotary sliding sleeve and an outer wall of the second through hole is arranged in the upper rotary sliding sleeve, an inserting hole corresponding to the inserting rod is arranged on the limiting block, the diameter of the sliding block is greater than that of the inserting rod, the sliding block is flush with the sliding groove.

7. The center lock structure of claim 2, wherein a skid resistance part is provided on an outer wall of the lower rotary sliding sleeve, and a part connecting hole is provided on a bottom of the lower rotary sliding sleeve.

* * * * *